3,637,867
PROCESS FOR THE PRODUCTION OF
ETHYLENIC COMPOUNDS
Duncan Clark and Percy Hayden, Norton-on-Tees, England, assignors to Imperial Chemical Industries Limited, London, England
No Drawing. Continuation-in-part of application Ser. No. 507,685, Nov. 15, 1965. This application Mar. 7, 1968, Ser. No. 711,206
Claims priority, application Great Britain, Nov. 19, 1964, 47,173/64
Int. Cl. C07c 41/10, 43/20
U.S. Cl. 260—614 AA                8 Claims

ABSTRACT OF THE DISCLOSURE

A transetherification process in which a vinyl ether such as methyl vinyl ether is reacted with an alkanol containing 1 to 20 carbon atoms or a phenol containing up to 8 carbon atoms in the presence of a Group VIII noble metal, preferably palladium, compound. The temperature is maintained between —50° C. and 200° C. and the water concentration in the reaction medium is kept below 10%.

---

This application is a continuation-in-part of co-pending U.S. application Ser. No. 507,685 filed Nov. 15, 1965 and now abandoned.

The invention relates to the production of ethylenic compounds from lower alkyl vinyl ethers and in particular to the production of one vinyl ether from another vinyl ether.

The process comprises contacting a vinyl ether with an organic hydroxy compound under substantially anhydrous conditions, in the presence of a salt of co-ordination compound of a noble metal of Group VIII of the Mendeléeff Periodic Table.

The vinyl ethers which may be used in the process may be represented by the formula:

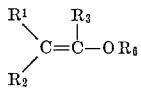

in which $R_1$, $R_2$ and $R_3$, may be the same or different and may be hydrogen, an organic substituent or a halogen atom, and $R_6$ may be an alkyl, alkenyl, alkynyl, cycloalkyl, cycloalkenyl, aralkyl, aryl, alkaryl, or heterocyclic group. Examples of such vinyl ethers are methyl vinyl ether, isobutylvinyl ether and methyl isopropenyl ether.

The organic substituents represented by $R_1$, $R_2$ and $R_3$, may be aliphatic, cycloaliphatic, aryl or heterocyclic groups, or any two of the groups $R_1$, $R_2$ and $R_3$, on the same or adjacent carbon atoms may be combined in such a way that the one carbon atom or the two adjacent carbon atoms are included in a cycloaliphatic, aromatic or heterocyclic ring. In this case structures of the type:

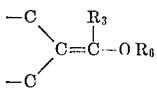       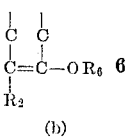

(a)                                    (b)

are obtained.
The overall reaction is:

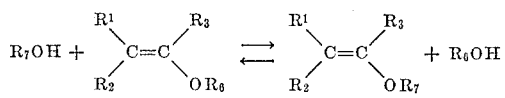

in which $R_7OH$ is the organic hydroxy compound and may be a monohydric, dihydric or polyhydric saturated or unsaturated alcohol in which case $R_7$ may be an aliphatic or cycloaliphatic group, or a monohydric, dihydric or polyhydric phenol in which case $R_7$ is an aryl group. $R_7$ may also be a heterocyclic group.

The alcohol or phenol may contain functional groups other than hydroxy groups. Such groups may be ketone, ether, ester, halogen or amino groups.

Preferred alkanols for use in the process are alkanols containing 1 to 20 carbon atoms, for example, methanol, ethanol, n-propanol, isopropanol, n-butanol, isobutanol, tert-butanol as well as allyl alcohol. Alcohols of greater chain length which may be used include lauryl alcohol, tetradecanol, hexadecanol and octadecyl alcohol, and those alcohols prepared by the "OXO" process such as octanols, nonanols, decanols and tridecanols.

Preferred phenols containing up to 8 carbon atoms and having no other functional substituents include phenol itself, cresols, xylenols, resorcinol, catechol and hydroquinone.

The process is of particular value in preparing difficultly obtainable vinyl ethers, for example phenyl vinyl ether, from those more readily obtainable, for example methyl vinyl ether and isobutyl vinyl ether. Additionally the present invention may provide a method for preparing vinyl ethers which is an improvement on processes at present available e.g. the preparation of methyl vinyl ether from isobutyl vinyl ether. The products of the process provide an important range of polymerisable monomers.

The noble metals of Group VIII of the Periodic Table which, in the form of their salts or co-ordination compounds are used in the process of the invention are ruthenium, rhodium, palladium, osmium, iridium and platinum. Palladium, platinum and rhodium are preferred metals for use in the process, especially palladium.

The metal is used in the process in the form of a salt or co-ordination compound, preferably one in which the metal exhibits its normal valency ("normal valency" is the valency that an element exhibits in a majority of its compounds—Van Nostrands Chemists Dictionary 1953, p. 723). Any salt may be used in the process for example halides or carboxylates especially lower aliphatic carboxylates containing up to six carbon atoms. In particular chlorides, bromides and acetates, for example palladous chloride, palladous bromide or palladous acetate may be used. Other examples of carboxylates which may be used include the propionates, butyrates, isobutyrates and crotonates of the noble metals of Group VIII. Mono- and di-carboxylates, unsubstituted or substituted with non-reactive substituents, e.g. palladous chloroacetate, are contemplated for use herein. It is preferable that the metal salt should be soluble in the reaction medium but many of the salts of the noble metals of Group VIII are relatively insoluble under the conditions of the process. It has been found however that some co-ordination compounds show a higher degree of solubility and may thus advantageously be used. In these co-ordination compounds the noble metal of Group VIII forms part of a complex with another ion or molecule. Suitable components of the complex include anions such as chloride, acetate, nitrate and sulphate ions and cations especially alkali or alkaline earth metal cations, particularly sodium and lithium. Molecules which may form part of the complex include benzonitrile, organo phosphines, phosphine oxides, phosphates and phosphites particularly triphenyl phosphite. Complex compounds which may advantageously be used in the process include the alkali metal halopalladites and haloplatinites e.g. lithium chloropalladite, lithium chloroplatinite, sodium chloropalladite, potassium chloropalladite, sodium and potassium bromopalladites, chloroplatinic acid, dichlorobis (benzonitrile)-palladium (II) ((PhCN)$_2$PdCl$_2$) and sodium and lithium bromoplatinites. Lithium bromopalladite has been found to be especially effective, particularly when used in combination with certain solvents which complex with palladium, such as dimethylsulphoxide. These solvents are further discussed later in this specification. The co-ordination compound may be added to the reactants as such or may be formed in situ, for example lithium chloropalladite may be added as such or lithium chloride and palladous chloride may be added separately to form lithium chloro-palladite in the reaction vessel.

The process may be carried out using stoichiometric proportions of ether and organic hydroxy compound, but it is preferred to use one of the reactants in excess to force the position of equilibrium of the reaction in favour of the desired products. In addition one of the reactants may be used in excess as the solvent. The process may also employ an inert solvent (which may however be capable of forming a complex with the noble metal of Group VIII) which may be an aliphatic hydrocarbon, for example pentane, hexane, octane or cyclohexane, an aromatic hydrocarbon, for example benzene, toluene or xylene, an ether, for example diethyl ether, an ester, for example dinonyl phthalate, or well known solvents such as tetrahydrofuran, dioxane, dimethylacetamide, sulpholane, dimethyl sulphoxide and benzonitrile.

Sulphoxides and sulphones which are liquid under the reaction conditions, dimethyl digol (the dimethyl ether of diethylene glycol) and benzonitrile are particularly useful solvents as they reduce any tendency of the noble metal, particularly palladium, to precipitate, and may also have a favourable effect on the product distribution, increasing the rate of formation of the desired ether and reducing the rate of formation of by-product acetals. Dimethyl sulphoxide and diphenyl sulphoxide are particularly preferred as solvents for these reasons and may also be added in lesser amounts, preferably at least 5% by weight to obtain the same beneficial effects, when one or other of the reactants is used as solvent.

The process of the invention is carried out under substantially anhydrous conditions as water may hydrolyse both the ethylenic reactant and the product of the reaction. It is important therefore to keep the concentration of water in the process as low as possible, but a small amount of water, for example up to 10% by weight, may be tolerated. Preferably the water concentration is less than 5% by weight, more preferably less than 1% by weight.

The process may be carried out in the temperature range —50° C. to 200° C. Although at the lower end of the temperature range the rate of the reaction decreases, the yield of unwanted by-products such as acetals is markedly decreased. It is preferable therefore to carry out the reaction at a relatively low temperature, for example in the range —30° C. to 100° C., particularly in the range —20° C. to 80° C.

The process may be carried out at atmospheric pressure or at an elevated pressure. As it is often desirable to remove the products of the reaction as soon as they are formed to avoid secondary reactions taking place, the process may advantageously be carried out at a reduced pressure. A pressure of up to 10 atmospheres may be used, preferably 0.1 to 1 atmosphere.

As stated above the relative concentrations of the vinyl ether and the organic hydroxy compound may be stoichiometric, or one or the other may be in excess. The concentration of the Group VIII salt or co-ordination compound may be up to 1 molar, but is preferably not greater than 0.1 molar particularly 0.0001 to 0.05 molar. Concentrations of less than 0.0001 molar may be used, as the metal acts as a catalyst, but at very low concentrations the rate of the reaction decreases.

The process may be homogeneous or heterogeneous and may take place in the liquid or gaseous phase. The heterogeneous reaction in the liquid phase may be accomplished by agitating the reactants with a solid salt or co-ordination compound of the noble metal of Group VIII deposited on a suitable support such as alumina, silica, or preferably active carbon, or by passing the reactants through a bed of the noble metal salt or co-ordination compound also deposited on a suitable support. The gas phase reaction may be performed by passing the gaseous vinyl ether and the organic hydroxy compound over the metal salt deposited on a similar support.

Under some conditions, operation of the process may be hampered by the precipitation of elemental palladium formed in side-reactions. This may however be substantially reduced or prevented by providing for the presence of complexing agent in excess of the amount which is necessary to render soluble the palladium compound employed. As described above, complexing agents which are also solvents, such as dimethyl sulphoxide, diphenyl sulphoxide, sulpholane, and benzonitrile may be used, but in addition to or instead of such a solvent excess alkali metal halides (excluding the fluoride) may be present. In particular when using lithium chloropalladite or dichlorobis (benzonitrile)-palladium (II) excess lithium chloride may be present. In general the complexing agent may be present in a ratio of approximately 10 moles complexing agent per mole of palladium compound.

An additional feature of our invention also relates to the prevention of the precipitation of the catalyst, particularly palladium in the metallic form, by reductive side reactions. This precipitation may be prevented by incorporating in the process a redox system which may be used in the presence of oxygen. Reduction of the metal salt to the metal is prevented by the oxidising property of the redox system which is itself converted to its reduced form. The reduced form of the redox is reoxidised by the oxygen present. A preferred redox system is that provided by a copper salt, for example cupric chloride, in which the cupric form is reduced to cuprous, which in turn is reoxidised to the cupric form by molecular oxygen. The concentration of the redox system is preferably $10^{-2}$ to $10^{-4}$ molar.

The process may be carried out in a batchwise or continuous manner. It is generally advantageous to remove the vinyl ether product of the reaction continuously as it is formed, and this may be accomplished by means such as distillation, preferably under reduced pressure, crystallisation or countercurrent extraction with a solvent. It is also helpful to purge the reaction mixture continuously with a stream of nitrogen, argon or other inert gas, condensing the vapours from the inert gas stream, returning unreacted material and removing the vinyl ether product of the reaction. For a fully continuous process the second product of the reaction, the hydroxy compound ($R_6OH$), may also be removed continuously by taking a purge from the reaction vessel, distilling it or extracting it continuously, and thereby separating the hydroxy compound from the catalyst and returning the latter to the process.

As described earlier one of the principal by-products produced in the process is acetals, i.e. the reaction products of aldehydes with alcohols and it may therefore be desirable to take steps to reduce the formation of acetals. This may be achieved by maintaining a stationary concentration of acetals in the reaction mixture. The acetals may be derived from either the organic hydroxy compound reactant in the process ($R_7OH$) or the organic hydroxy compound product of the process ($R_6OH$) or from both. For example when methyl vinyl ether is reacted with isobutyl vinyl ether dimethyl acetal, di-isobutyl acetal and methyl isobutyl acetal may be present. A suitable concentration of acetals may be chosen with reference to the reaction conditions and although very high concentrations of acetals may be used the concentration is usually chosen by reference to economic considerations, such as reactor size. Such a concentration may be up to 20% by weight of the reaction mixture, preferably about 10%, more preferably about 5%. The acetals may be deliberately added at the start of the process to provide the desired acetals concentration, while in a continuous process acetals may be removed or recycled at such a rate as to maintain the stationary concentration.

EXAMPLE 1

A solution of 0.01 mole of lithium chloropalladite in isobutanol was pumped at a rate of 9.6 ml./hr. (0.104 mole/hr.) into the top of a vertical glass column 50 cms. long and 1.6 cm. internal diameter packed with glass helices, and allowed to trickle down the column. Gaseous methyl vinyl ether was introduced into the base of the column at a rate of 5.25 litres/hr. (0.215 mole/hr.) and passed countercurrent to the descending isobutanol solution. The temperature within the column was 25° C. and the pressure atmospheric. After 62 minutes the alcohol which collected at the base of the column contained 1.81 gm. (0.018 mole) of isobutyl vinyl ether.

EXAMPLE 2

A solution of 0.01 mole of lithium chloropalladite in isobutanol was allowed to trickle down the column at a rate of 11.5 mls./hr. (0.124 mole/hr.). Methyl vinyl ether was fed into the base of the column at a rate of 3.61 litres/hr. (0.148 mole/hr.). The column was maintained at a pressure of 60 mm. of mercury and a temperature of 25° C. The vapours leaving the column were condensed in a methanol/solid carbon dioxide cooled trap.

After 75 minutes the condensate of the exit vapour stream contained 1.89 g. (0.019 mole) of isobutyl vinyl ether.

EXAMPLE 3

A solution of 0.01 mole of lithium chloropalladite in isobutanol was allowed to trickle down the column at a rate of 30 mls./hr. (0.324 mole/hr.). Methyl vinyl ether was fed into the base of the column at a rate of 3.61 litres/hr. (0.148 mole/hr.). Argon was also fed into the base of the column at a rate of 20 litres/hr. to remove methanol overhead.

Isobutyl vinyl ether was collected in the alcohol at the base of the column.

EXAMPLE 4

100 mls. of isobutanol solvent mixture containing lithium chloropalladite were placed in an oxidation pot fitted with an oil-sealed, hollow cruciform stirrer, a serum cap, through which liquid samples could be withdrawn, a thermometer and an air-cooled condenser. Facilities were provided to immerse the pot in a cooling bath, or to heat it with an infra-red lamp, thermostatically controlled.

Methyl vinyl ether was metered and mixed with a metered supply of nitrogen (or argon). The mixed gas stream was passed into the reaction liquid at a rate of 6 litres/hour methyl vinyl ether and 75 litres/hour of argon via the hollow cruciform stirrer and the exit gas stream was passed up the air-cooled condenser through three acetone/solid carbon dioxide cooled traps. Provision was also made for passing the exit gas stream through a gas sample tube to collect samples during the reaction.

Samples of the reaction liquid were withdrawn through the serum cap using a syringe during the reaction and analysed by gas liquid chromatography.

The temperature of the reaction was 20° C. and the pressure atmospheric.

The Table I below gives the distribution of products using various solvents and the effect of the latter on palladium precipitation.

TABLE I

| Percent isobutanol | Solvent | Percent solvent | Catalyst concentration molar ×10⁻² | Rate of make of products moles/litre/hour ||||| Palladium precipitation |
|---|---|---|---|---|---|---|---|---|
| | | | | Isobutyl vinyl ether | Isobutyl methyl acetal | Diisobutyl acetal | Acetaldehyde | |
| 100 | None | | | 1.0 | 0.10 | 0.56 | 0.90 | 0.02 | Yes. |
| 95 | Dimethyl sulphoxide | 5 | | 0.14 | 0.06 | 0.19 | 0.39 | | No. |
| 90 | do | 10 | | 0.15 | 0.12 | 0.14 | 0.29 | | No. |
| 82.5 | do | 17.5 | | 0.25 | 0.20 | 0.10 | 0.32 | 0.06 | No. |
| 75 | do | 25 | | 1.0 | 0.34 | 0.07 | 0.27 | | No. |
| 50 | do | 50 | | 1.0 | 0.26 | 0.04 | 0.11 | | No. |
| 20 | do | 80 | | 1.0 | 0.09 | 0.02 | 0.02 | 0.06 | No. |
| 80 | Sulpholane | 20 | | 1.0 | 0.06 | 0.8 | 1.1 | | No. |
| 60 | do | 40 | | 1.0 | 0.07 | 0.91 | 1.03 | 0.14 | No. |
| 80 | Benzonitrile | 20 | | 1.0 | 0.10 | | 0.90 | 0.09 | No. |
| 50 | do | 50 | | 1.0 | 0.18 | 0.97 | 0.70 | | No. |
| 80 | Diphenyl sulphoxide | 20 | | 1.0 | 0.06 | 0.60 | 0.81 | | No. |
| ¹ 50 | Dimethyl digol | 50 | | 1.0 | 0.16 | 0.07 | 0.4 | | No. |

¹ In this reaction the methyl vinyl ether feed rate was 4 litres/hour, and argon was fed in at 60 litres/hour. The pressure was 100 mm.

EXAMPLE 5

The conditions were the same as in Example 4, the reaction mixture comprising 75 mls. of dimethyl sulphoxide and 25 mls. of isobutanol. Varying quantities of catalyst (lithium chloropalladite) were used. The results are given in Table II.

TABLE II

| Catalyst concentration ×10⁻³ | Rate of make of products moles/litre/hr. ||||
|---|---|---|---|---|
| | Isobutyl vinyl ether | Isobutyl methyl acetal | Diisobutyl acetal | Acetaldehyde |
| 3.75 | 0.064 | 0 | 0 | 0.02 |
| 10 | 0.171 | 0.015 | 0.035 | 0.025 |
| 20 | 0.10 | 0.049 | 0.08 | 0.04 |

EXAMPLE 6

The apparatus was the same as in Example 4, the methyl vinyl ether feed rate being 4 litres/hour, the argon feed rate 60 litres/hour and the reaction medium 50% dimethyl digol and 50% isobutanol. The catalyst was lithium chloropalladite in a concentration of $1 \times 10^{-3}$ molar. The results in the Table III show the effect of a stationary concentration of 8% dimethyl acetal in reducing acetal formation.

TABLE III

| Isobutanol, percent | Dimethyl digol, percent | Added dimethyl acetal, percent | Rate of make of products moles/litre/hour |||
|---|---|---|---|---|---|
| | | | Isobutyl vinyl ether | Isobutyl methyl acetal | Diisobutyl acetal |
| 50 | 50 | Nil | 0.07 | 0.05 | 0.11 |
| 46 | 46 | 8 | 0.14 | 0.04 | 0.06 |

EXAMPLE 7

The apparatus was the same as in Example 4. The results given in Table IV show the use of lithium bromopalladite as catalyst.

TABLE IV

| Catalyst conc molar × 10⁻² | Methyl vinyl ether feed rate litres/hour | Percent of — | | Rate of make of products moles/litre/hour | | | |
|---|---|---|---|---|---|---|---|
| | | Dimethyl sulphoxide | Iso-butanol | Iso-butyl vinyl ether | Iso-butyl methyl acetal | Diiso-butyl acetal | Acetaldehyde |
| 0.8 | 6 | 25 | 75 | 0.25 | 0.03 | 0.06 | 0.00 |
| 1.0 | 12 | 25 | 75 | 0.59 | 0.08 | 0.15 | 0.00 |
| 1.0 | 12 | 50 | 50 | 0.44 | 0.04 | 0.04 | 0.00 |

EXAMPLE 8

The apparatus and conditions were the same as in Example 4, the reaction medium comprising 75 mls. dimethyl sulphoxide and 25 mls. isobutanol. The catalyst was lithium chloropalladite in a concentration of $1 \times 10^{-2}$ molar. The effect of changing the temperature is shown in Table V.

TABLE V

| Temperature, °C. | Rate of make of products moles/litre/hour | | | |
|---|---|---|---|---|
| | Iso-butyl vinyl ether | Iso-butyl methyl acetal | Diiso-butyl acetal | Acetaldehyde |
| 10 | 0.075 | 0.012 | 0.017 | |
| 20 | 0.171 | 0.015 | 0.035 | 0.025 |
| 30 | 0.084 | 0.043 | 0.072 | |
| 40 | 0.063 | 0.056 | 0.073 | |

What is claimed is:

1. A process for the production of a second vinyl ether from a first vinyl ether which comprises contacting a lower alkyl vinyl ether with an alkanol containing 1 to 20 carbon atoms or a monohydric or dihydric phenol containing up to 8 carbon atoms and free from other functional groups at a temperature in the range —50° to 200° C., under anhydrous conditions or in the presence of at most 10% by weight of water and of a catalytically effective amount of a noble metal compound selected from the group consisting of the chlorides, bromides and lower alkanoates of the noble metals of Group VIII of the Periodic Table, chloroplatinic acid, dichlorobis (benzonitrile)-palladium (II) and the alkali metal chloro- and bromo-palladites and platinites, and maintaining a stationary concentration of up to 20% by weight of the reaction medium of an acetal derived from the alcohol co-product of the reaction by removing said acetal at such a rate as to maintain said stationary concentration.

2. The process of claim 1 in which methyl vinyl ether, isobutyl vinyl ether or methyl isopropenyl ether is contacted with an alkanol selected from the group consisting of methanol, ethanol, n-propanol, isopropanol, n-butanol, isobutanol, tert-butanol, lauryl alcohol, tetradecanol, hexadecanol, octadecyl alcohol, octanols, nonanols, decanols and tridecanols, under anhydrous conditions or in the presence of at most 5% by weight of water, in the presence of:
    (1) 0.0001 to 0.05 molar concentration of a palladium compound selected from the group consisting of palladous chlorides and bromides,
    (2) at least 5% of dimethyl sulphoxide or sulpholane,
    (3) a stationary concentration of up to 20% by weight of the reaction mixture of an acetal derived from the alcohol co-product of the reaction and maintained stationary by removing said acetal at such a rate as to maintain said concentration, and
    (4) a lithium halide (excluding the fluoride) whereby a soluble complex co-ordination compound is formed with component (1), at a temperature in the range —50° C. to 200° C. and a pressure in the range 0.1 to 10 atmospheres.

3. A process for the production of a second vinyl ether from a first vinyl ether which comprises contacting a lower alkyl vinyl ether with an alkanol containing up to 20 carbon atoms or a monohydric or dihydric phenol containing 1 to 8 carbon atoms and free from other funtional groups, at a temperature in the range —50° C. to 200° C., in the presence of up to 10 percent by weight of water and catalytically effective amount of a noble metal compound selected from the group consisting of chlorides, bromides and acetates of noble metals of Group VIII of the Periodic Table, chloroplatinic acid, dichlorobis (benzonitrile)-palladium (II), lithium chloropalladite and lithium bromo palladite and maintaining a stationary concentration of up to 20% by weight of the reaction medium of an acetal derived from the alcohol co-product of the reaction by removing said acetal at such a rate as to maintain said stationary concentration.

4. The process of claim 1 in which said noble metal is palladium.

5. The process of claim 2 in which said noble metal compound is palladous chloride, palladous bromide, palladous acetate, lithium chloropalladite or lithium bromopalladite.

6. The process of claim 1 in which said first vinyl ether is methyl vinyl ether, isobutylvinyl ether or methyl isopropenyl ether.

7. The process of claim 1 in which an inert solvent selected from the group consisting of pentane, hexane, octane, cyclohexane, benzene, toluene, xylene, diethyl ether, dinonyl phthalate, dimethyl sulphoxide, dimethyl digol, diphenyl sulphoxide, tetrahydrofuran, dioxane, dimethylacetamide, sulpholane and benzonitrile is present.

8. The process of claim 1 in which a redox system is present.

References Cited

UNITED STATES PATENTS 3,479,392    11/1969    Stern et al. _____ 260—614 AA

FOREIGN PATENTS 1,017,604    1/1966    Great Britain _____ 260—614
6514991      5/1966    Netherlands _____ 260—614

HOWARD T. MARS, Primary Examiner

U.S. Cl. X.R.

260—571, 584 C, 592, 594, 611 A, 611 R, 612 D, 613 D, 615 A